United States Patent [19]

Das et al.

[11] Patent Number: 4,935,832
[45] Date of Patent: Jun. 19, 1990

[54] RECORDING HEADS WITH SIDE SHIELDS

[75] Inventors: Shyam C. Das, Sudbury; Michael L. Mallary, Berlin, both of Mass.

[73] Assignee: Digital Equipment Corporation, Maynard, Mass.

[21] Appl. No.: 168,978

[22] Filed: Mar. 16, 1988

Related U.S. Application Data

[63] Continuation-in-part of Ser. No. 33,446, Apr. 1, 1987, and a continuation-in-part of Ser. No. 79,117, Jul. 29, 1987.

[51] Int. Cl.$^5$ ............................ G11B 5/12; G11B 5/38
[52] U.S. Cl. .................................... 360/112; 360/113; 360/121
[58] Field of Search ............... 360/110, 112, 113, 119, 360/120, 121, 122, 123, 125, 126, 127, 128, 129

[56] References Cited

U.S. PATENT DOCUMENTS

| | | | |
|---|---|---|---|
| 3,700,828 | 10/1972 | Zacoroli | 360/128 |
| 3,921,217 | 11/1975 | Thompson | 360/113 |
| 4,566,050 | 1/1986 | Beam et al. | 360/113 |
| 4,633,352 | 12/1986 | Mizoguchi et al. | 360/128 |
| 4,651,243 | 3/1987 | Daste et al. | 360/128 |
| 4,656,546 | 4/1987 | Mallory | 360/110 |
| 4,758,917 | 7/1988 | Gooch | 360/128 |
| 4,816,950 | 3/1989 | Heinz et al. | 360/128 |

FOREIGN PATENT DOCUMENTS

| | | | |
|---|---|---|---|
| 59-54070 | 3/1984 | Japan | 360/128 |
| 62-89206 | 4/1987 | Japan | 360/113 |
| 62-129909 | 6/1987 | Japan | 360/113 |

OTHER PUBLICATIONS

Shew, "Increased Density Magnetic Recording," IBM TDB, vol. 2, No. 2, Aug. 1959, p. 35.
Vinal, "Magnetically Shielded Twin-Track Magnetic Read Head Structure," IBM TDB, vol. 26, No. 7B, Dec. 1983, pp. 3748-51.

Primary Examiner—John H. Wolff
Attorney, Agent, or Firm—Fish and Richardson

[57] ABSTRACT

Side shields are provided adjacent to the magnetic poles of recording heads. The side shields are used for read and write operations for both longitudinal and vertical recording. During read, the side shields intercept flux from adjacent tracks and shunts it around the sensor to magnetic ground. During write, side shields contain the write field of the head so that it does not corrupt the data on adjacent tracks. Embodiments are disclosed for both longitudinal and perpendicular or vertical recording.

7 Claims, 5 Drawing Sheets

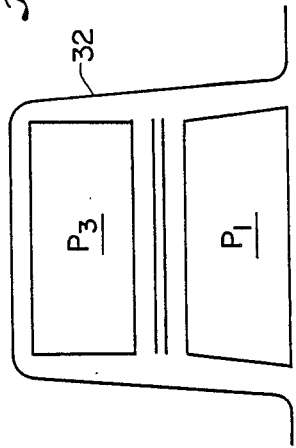
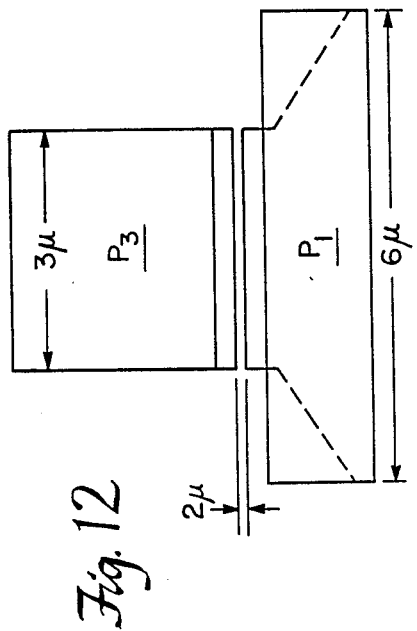
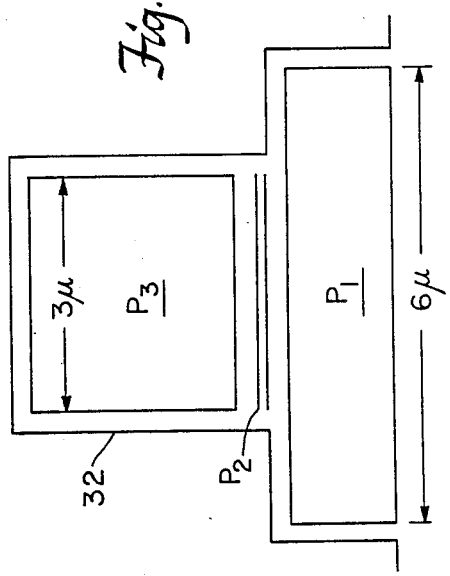
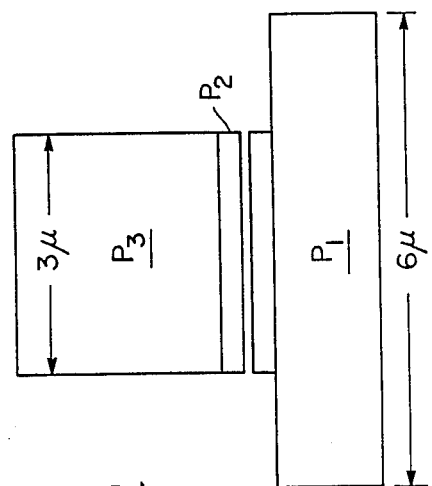

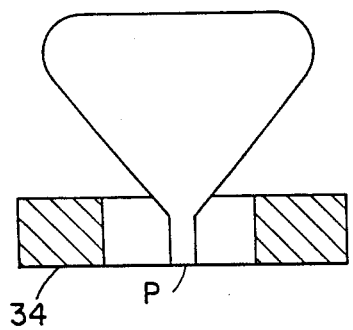
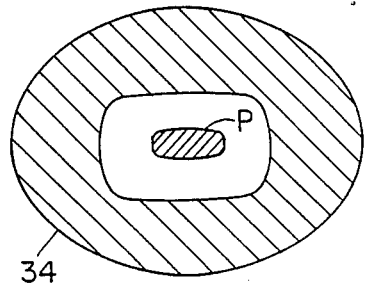
Fig. 16a  Fig. 16b
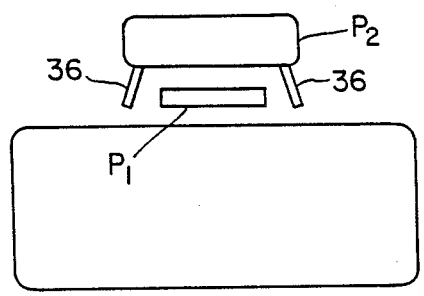
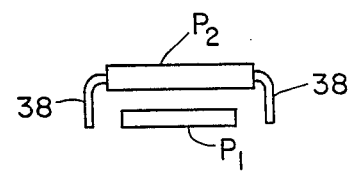
Fig. 17  Fig. 18
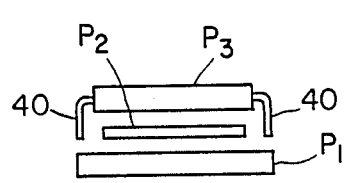
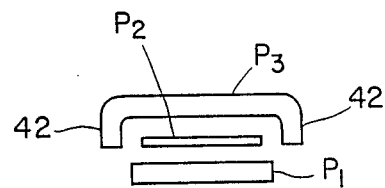
Fig. 19  Fig. 20

RECORDING HEADS WITH SIDE SHIELDS

This application is a continuation-in-part of U.S. patent application Ser. No. 033,446, filed Apr. 1, 1987, entitled "Thin Film Head Having a Magneto-Resistive Read Element, and U.S. patent application Ser. No. 079,117, filed July 29, 1987, entitled "Three-Pole Magnetic Recording Head".

BACKGROUND OF THE INVENTION

This invention relates to magnetic recording heads.

Magnetic recording heads are used for reading and writing data onto magnetic media such as magnetic disks. Information on the disks is contained in concentric tracks on the disk. As the number of tracks per inch is increased in magnetic recording, cross talk with adjacent tracks becomes more and more of a problem. During write, fringing fields from the write poles can erase or corrupt information on adjacent tracks. During read, flux from adjacent tracks can corrupt the read process. It is therefore desirable to substantially isolate read/write heads from adjacent tracks.

SUMMARY OF THE INVENTION

According to the invention, the recording head includes at least one magnetic pole and magnetic side shields disposed adjacent to the pole, the side shields disposed to shield the pole from adjacent tracks on a magnetic medium. Embodiments are disclosed for both longitudinal and vertical recording in monopole, two-pole, and three-pole heads.

BRIEF DESCRIPTION OF THE DRAWING

FIG. 12 is a pole tip view of a three-pole head before track trim;

FIG. 13 is a pole tip view of a three-pole head after complete track trim and including shield gap and side shields;

FIG. 14 is a pole tip view of a three-pole head with partial track trim;

FIG. 15 is a pole tip view of a three-pole head with partial track trim and side shields;

FIGS. 16a and 16b are planar and pole tip views, respectively, of a shielded monopole read/write vertical head;

FIG. 17 is a pole tip view of a three-pole read/write head for vertical recording with saturable side shields;

FIG. 18 is a pole tip view of a two-pole head with saturable side shields;

FIG. 19 is a pole tip view of a three-pole head with saturable side shields;

FIG. 20 is a pole tip view of a three-pole head with non-saturable side shields.

DESCRIPTION OF A PREFERRED EMBODIMENT

Figure 1:
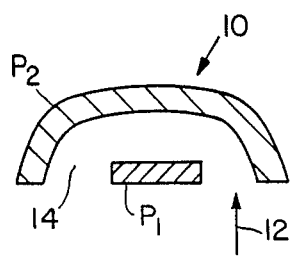
FIG. 1 is a pole tip view of a two-pole head suitable for longitudinal or vertical recording.

The theory on which the present invention is based will be discussed now in conjunction with FIGS. 1 and 2. In FIG. 1, a two-pole head 10 suitable for both longitudinal and vertical recording includes a first pole P1 and a second pole P2. Magnetic media (not shown) moves in the direction of an arrow 12 past the head 10 so that the pole P2 is the downstream pole (last seen by the moving media). Note that the downstream pole P2 wraps around the pole P1 providing side shielding, i.e., shielding from adjacent tracks parallel to the direction parallel to the arrow 12. The side shielding in FIG. 1 causes the longitudinal field in the edge region to fall off as $1/R^2$, where R is the distance from the side gap 14. Without the shielding afforded by pole P2 wrapping around pole P1, the field would fall off more slowly (e.g., as $1/R$) so that cross talk in read and write becomes a problem. This relationship applies when the pole 10 of FIG. 1 is used for longitudinal recording.

The suppression of write fringing in perpendicular recording can be achieved by the geometry of the heads shown in FIGS. I and 2. A three-pole head 16 of FIG. 2 is a read/write vertical head. Pole P2 is an inductive or flux sensing read pole. Pole P1 is the write pole and pole P3 is a downstream pole and provides side shield portions 18. When the geometries of FIG. 1 or FIG. 2 are used in perpendicular or vertical recording with a soft magnetic underlayer, the fringing perpendicular field falls exponentially with R. Without the side shields, the field falls off as approximately $1/R$. By using side shields, the thickness of an erase guard band next to an adjacent track can be reduced.

Figure 3:
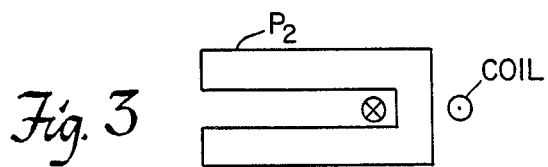
FIG. 3 is a cross-sectional view of a symmetric two-pole head employing an inductive coil.
Figure 4:
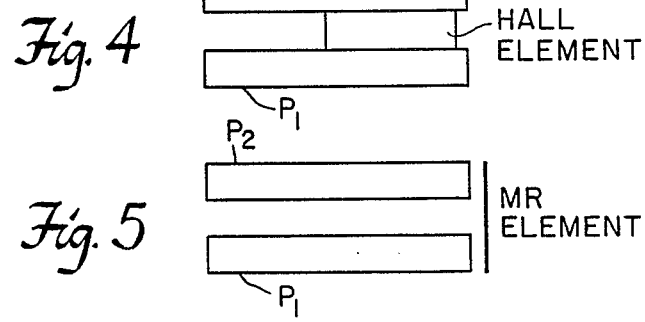
FIG. 4 is a cross-sectional view of a symmetric two-pole head employing a Hall element sensor.
Figure 5:
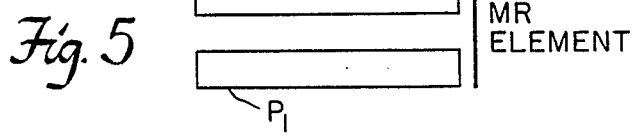
FIG. 5 is a cross-sectional view of a symmetric two-pole head employing an MR element.
Figure 6:
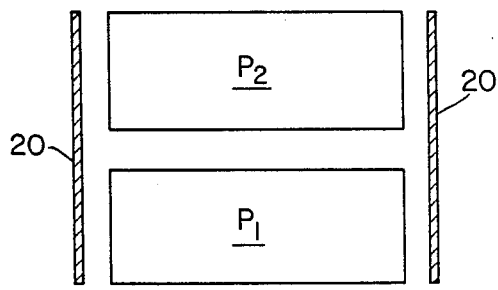
FIG. 6 is a pole tip view of a symmetric two-pole head having saturable side shields.

During readback, side shields can be used to intercept flux from adjacent tracks and to prevent it from passing through the sensor. Keeping the flux out of the sensor can be difficult to achieve because different head symmetry properties call for different approaches. Completely symmetric heads are shown schematically in FIGS. 3, 4 and 5 for inductive, Hall, and MR sensors, respectively, in two-pole heads. For these heads, side shields must intercept the flux and channel it equally into both poles so that no net flux goes through the sensors. Such saturable side shields 20 (FIG. 6) have equal exposure areas to both poles P1 and P2 so that they insert half the flux into each. These thin shields 20 saturate during write so that they do not soak up too much flux during write and thus lead to an overwrite problem. Therefore, they do not reduce write fringing. This can be an advantage in wiping out previous on-track data when there is significant error in track following (this process writes wide and reads narrow). In mechanic sets that have small tracking error, write shielding becomes more of an advantage and can be achieved by thickening the shields 20 so that they do not saturate during write.

Figure 7:
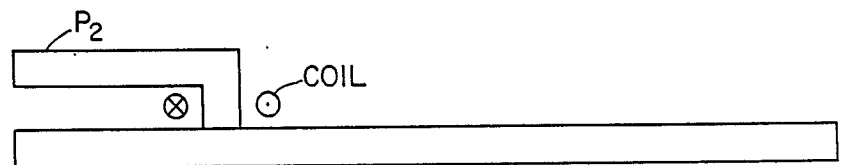
FIG. 7 is a cross-sectional view of an asymmetric two-pole head employing an inductive sensor.
Figure 8:
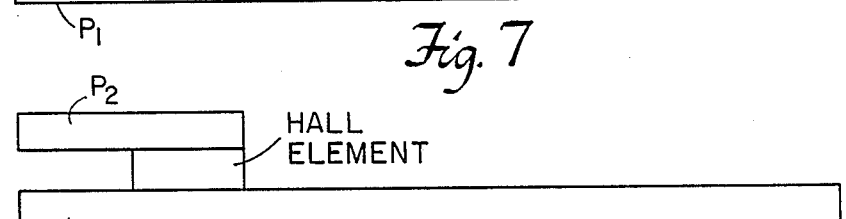
FIG. 8 is a cross-sectional view of an asymmetric two-pole head employing a Hall element.
Figure 9:
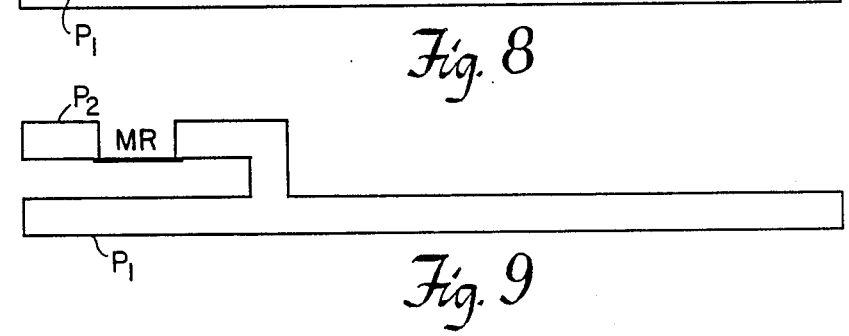
FIG. 9 is a cross-sectional view of an asymmetric two-pole head employing an MR sensor.
Figure 10:
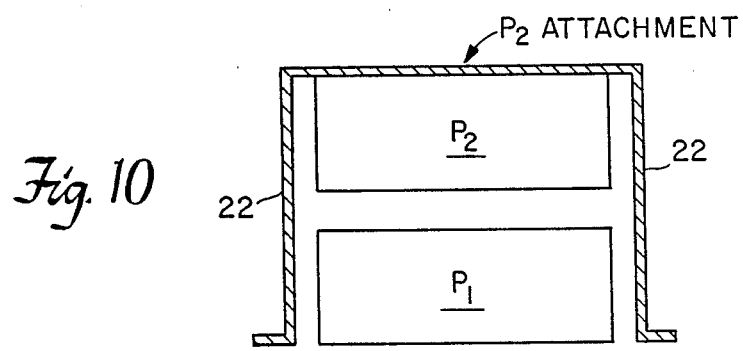
FIG. 10 is a pole tip view of an asymmetric two-pole head having saturable side shields for a grounded P2.
Figure 11:
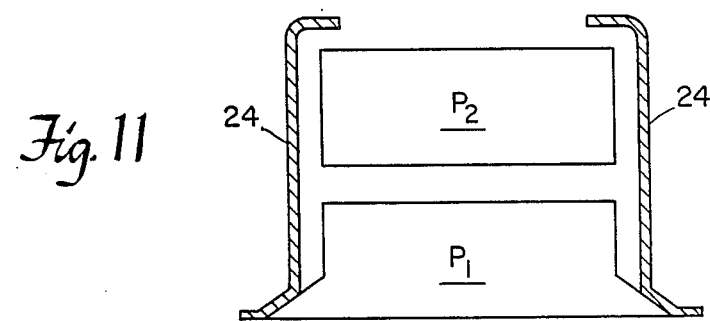
FIG. 11 is a pole tip view of another asymmetric two-pole head having saturable side shields for a grounded P1.

With two-pole heads that are not symmetric, side shields must be attached to the pole which is "magnetic ground" so that the fringing flux bypasses the sensor. Asymmetric heads in which the bottom pole (P1) is ground are shown in FIGS. 7, 8 and 9 for inductive, Hall, and MR sensors, respectively. The pole P1 in these figures is ground because it is so much bigger than the other pole P2 and is the low reluctance path for the flux to get out to infinity. Similarly, the top pole P2 can be made into the grounded pole by making it the big one. FIG. 10 shows side shields 22 used with an asymmetric two-pole head with the pole P2 serving as the magnetic ground. The saturable side shields 22 are attached to the pole P2. Similarly, FIG. 11 shows side shields 24 used with an asymmetric two-pole head with the pole P1 serving as the magnetic ground and the saturable side shields 24 are attached to the pole P1. Thickening the side shields 22 and 24 to provide write shielding in the context of low tracking error is feasible for the P2 grounded designs of FIG. 11 and of FIG. 1. However, for longitudinal recording, write shielding with a grounded P1 (FIG. 11) will produce transverse recording which causes undesirable pulse shape effects.

Figure 2:
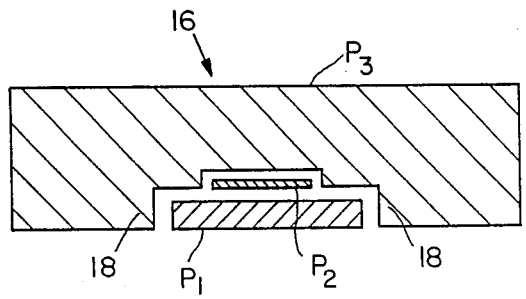
FIG. 2 is a pole tip view of a three-pole head for vertical recording.

In the case of three-pole heads such as the head 16 of FIG. 2 in which the central pole is used for readback, side shielding is less problematic. The ground poles during readback are the top and bottom poles (P1 and P3). These are the poles that are used for writing. A process for producing a three-pole head with side shields is illustrated in FIGS. 12, 13, 14, and 15. FIG. 12 shows a three-pole head structure 30 before ion milling is used to trim the width of the poles P2 and P1 to the width of P3 (which also serves as a mask). After trimming, a gap layer is deposited and a thin NiFe side shield layer 32 (FIG. 13) is sputtered over the structure. The shield 32 is then trimmed off with more ion milling after a mask is placed over the shield 32 so that it is not removed. Variations of this process is shown in FIGS. 14 and 15. During write, the shield 32 saturates and is effectively not there. During read, it intercepts flux from adjacent tracks and channels it into P1 and P3. Little flux gets into P2 (the sense pole) because the area of exposure to P2 is small relative to P1 and P3. In FIGS. 14 and 15, pole P3 is used as a milling mask for pole P2 alone. The head of FIGS. 14 and 15 will have more write fringing than the head in FIG. 13.

FIGS. 16a and 16b illustrate an embodiment of the invention for use with a monopole type read/write head for vertical recording in which a read/write pole tip P is surrounded by very thick, soft magnetic material 34. The thick, soft magnetic material 34 shields the pole tip P from the flux emerging out of the transitions from the adjacent or the same track during the read operation. During the write operation on vertical media with a soft underlayer, the shield 34 surrounding the pole P prevents the flux from being sprayed in the areas of the adjacent transitions on the same track or on adjacent tracks. This very thick shield dilutes the intensity of the write field (spreads over the thickness of the shield) and thus does not affect already written transitions during the write process. The head of FIG. 16 may be either inductive or of the flux sensing type.

FIG. 17 illustrates a three-pole type of read/write head for vertical recording with saturable side shields 36. During the write process, the two magnetic shields or whiskers 36 saturate. During read, however, the whiskers 36 are fully effective magnetic shields which prevent flux from adjacent transitions from coming into the read pole P1. The whiskers 36 may be formed from the seed layers in the formation of the pole P2.

Another embodiment of the invention is shown in FIG. 18 which is a saturable side shield version of FIG. 1. That is, the shields 38 are thinner than the shield portions of the pole P2 of FIG. 1. The thin side shields 38 may be the seed layers during the formation of P2, thus saving the extra process step in depositing the side shields.

FIG. 19 illustrates a three-pole read/write head for longitudinal recording. The central pole P2 may be flux sensing or an inductive type read head. The poles P1-P3 combination acts as a write pole (P2 being smaller in track width than P1 and P3, thus writing wide and reading narrow). Thin side shields 40 are a part of the pole P3. The side shields 40 may constitute the seed layer during the formation of pole P3. The side shields 40 saturate during the write operation and writes wider than read by the narrower track pole P2. Flux is shielded by the side shields 40 during the read operation. FIG. 20 is a version of the embodiment of FIG. 19 with non-saturable side shields 42 which are thicker than the side shields 40 in the embodiment of FIG. 19.

Figure 21:
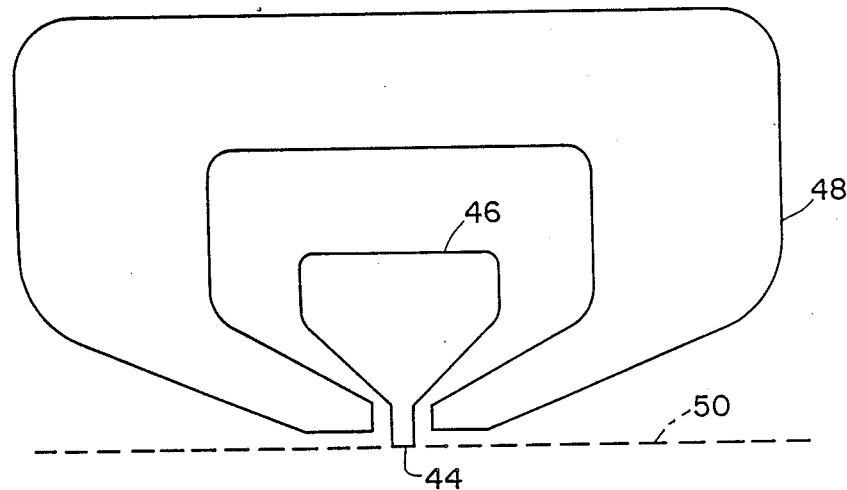
FIG. 21 is a planar view of a two-pole or monopole head with self-grounded side shields.

In FIG. 21 the side shield 48 is self-grounded by virtue of its large area. This type of shield protects the yoke 46 as well as the pole tips 44 from adjacent track flux. The shield does not extend down to the head media interface 50 in order to avoid converting low frequency residual cross talk into higher frequencies. This design is appropriate to monopole and two-pole heads. This design is similar to that shown in FIG. 16. It is thus seen that the magnetic heads including side shields disclosed herein reduce the negative impact of fringing during read and write, allowing for higher track density and a reduced cost per bit stored.

It is recognized that modifications and variations of the present invention will occur to those skilled in the art and it is intended that all such modifications and variations be included within the scope of the appended claims.

What is claimed is:

1. A recording head comprising:
   a center magnetic pole and two outer magnetic poles which are coupled in a yoke region in one end of the head and are respectively separated by longitudinally extending gaps as the poles extend longitudinally from the yoke region, the poles terminating at a tip region of the head, this tip region configured to operate generally parallel to the surface of a recording medium; and
   at least one magnetic side shield for shielding the center pole disposed adjacent to the center pole, the side shield extending from one of the outer poles generally perpendicularly to the gaps.

2. The recording head of claim 1 wherein the magnetic side shield is made of magnetically soft material.

3. The recording head of claim 1 wherein the side shield is substantially non-saturable with respect to the pole tips in the read mode.

4. The recording head of claim 1 wherein said region defines an air bearing surface of the head and the poles appear asymmetrical when looking through the air bearing surface from the medium location.

5. The recording head of claim 1 wherein the magnetic side shield is made of NiFe.

6. The recording head of claim 1 wherein the side shield is an intimate component of one of the outer poles such that the shield is inherently grounded to that pole.

7. The recording head of claim 6 wherein the inherently grounded side shield does not extend over the entire pole.

* * * * *